(No Model.)
C. P. ORNE.
ELECTRIC BATTERY.
No. 283,355. Patented Aug. 14, 1883.
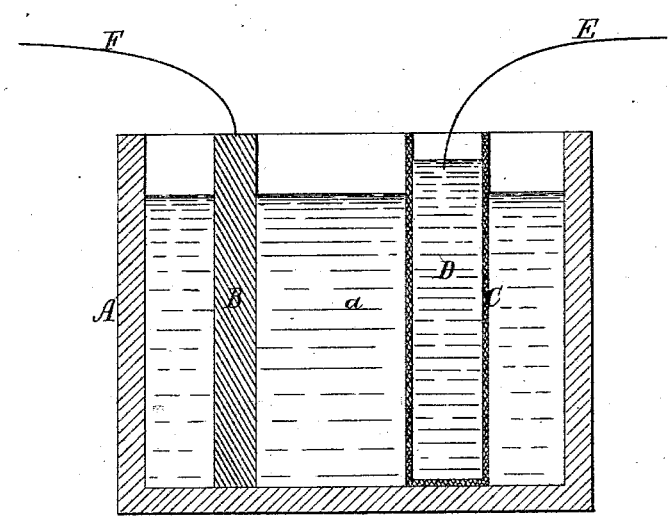
Witnesses
S. N. Piper.
E. A. Pratt.
Inventor
Charles Parker Orne
by R. H. Eddy att'y.

UNITED STATES PATENT OFFICE.

CHARLES PARKER ORNE, OF CAMBRIDGE, ASSIGNOR, BY MESNE ASSIGNMENTS, TO HIMSELF, AND JOEL S. ORNE, OF CAMBRIDGEPORT, MASS.

ELECTRIC BATTERY.

SPECIFICATION forming part of Letters Patent No. 283,355, dated August 14, 1883.

Application filed May 1, 1883. (No model.)

*To all whom it may concern:*

Be it known that I, CHARLES PARKER ORNE, of Cambridge, in the county of Middlesex, of the Commonwealth of Massachusetts, have invented a new and useful Improvement in Electric Batteries; and I do hereby declare the same to be described in the following specification, and represented in the accompanying drawing, which is a vertical section of a battery of my improved kind.

This battery, like various others, has a jar or vessel, of glass or other proper material, for holding the acid solution, and within such solution is a plate or stick of carbon and a porous cell, the latter in some cases containing a solution and a stick or piece of zinc immersed therein.

In carrying out my invention I have in the porous cell, instead of the solution and metal, a fluid amalgam consisting of mercury and zinc in or about in the proportions of one part, by weight, of zinc, to sixteen parts, by weight, of mercury. The fluid amalgam is to extend both above and below the surface of the acid solution surrounding or against the outer surface of the porous cell, and when the battery is in operation should be in electrical connection with one of the circuit-wires, the other of said wires being in electrical connection with the plate or stick of carbon inserted within the acid solution. The acid solution I prefer for the purpose I usually make of one part, by weight, of sulphuric acid, one part, by weight, of bichromate of potash, and seven parts, by weight, of water.

In the drawing, A denotes the vessel for containing the acid solution *a*. B is the stick of carbon, and C the porous cell inserted in such solution.

D is the fluid amalgam of mercury and zinc, it being within the porous cell and to a level therein above that of the surface of the acid solution against the outer surface of the cell. The said cell is to be of porous earthenware or other suitable material.

One circuit-wire, E, is represented as inserted in the fluid amalgam, and the other, F, as electrically connected with the stick B, of carbon.

With an electric battery so made all chemical action of the said solution on the zinc ceases when the battery is not in use or the circuit is broken, chemical action for the production of electricity taking place only when the circuit is closed, as the mercury operates in some way unknown to me to prervent such chemical action, whereas in the common battery, wherein the zinc is placed directly in the solution in the porous, cell surrounded by another or acid solution, chemical action on the zinc takes place when the circuit is broken, as well as when it is closed.

Thus the advantages of my improvement are that there is not only no oxidation or loss of the zinc while the battery is not in use, but such battery is generally, if not always, ready for use by reason thereof.

It is important to have the liquid amalgam in the porous cell extend above the surface of the acid solution about the cell, in order that any scum or oxide or foreign matter that may rise or gather on the upper surface of the liquid amalgam may not come in contact with the solution, so as to stop the working of the battery.

I do not claim a battery composed of a vessel and an acid solution therein, a stick or plate of carbon in such solution, and a porous cell in the solution, and containing another solution and a stick of metal therein.

I am aware that an amalgam has been used with a battery, and that it has been proposed to suspend such amalgam in a reticulated bag in the acid solution.

I am also aware that it is not new *per se* to have an electrode extend above the surface of the acid solution; but it is new to have the amalgam extend above, and thereby the impurities, &c., which rise are kept out of contact with the solution, as before stated.

I claim—

The improved electric battery, substantially as described, consisting of a jar or vessel, an acid solution therein, a stick or body of carbon, and a porous cell inserted in such solution, and a charge of liquid mercurial amalgam placed in the said cell and extending both above and below the level of the surface of the said acid solution, one of the circuit-wires, when the battery is in use, being in electrical connection with the carbon and the other with the amalgam, as explained.

CHARLES PARKER ORNE.

Witnesses:
R. H. EDDY,
E. B. PRATT.